Jan. 15, 1929.
G. D. TURNBOW
1,699,170
APPARATUS FOR PRODUCING FROZEN FOOD PRODUCTS
Filed Nov. 13, 1926
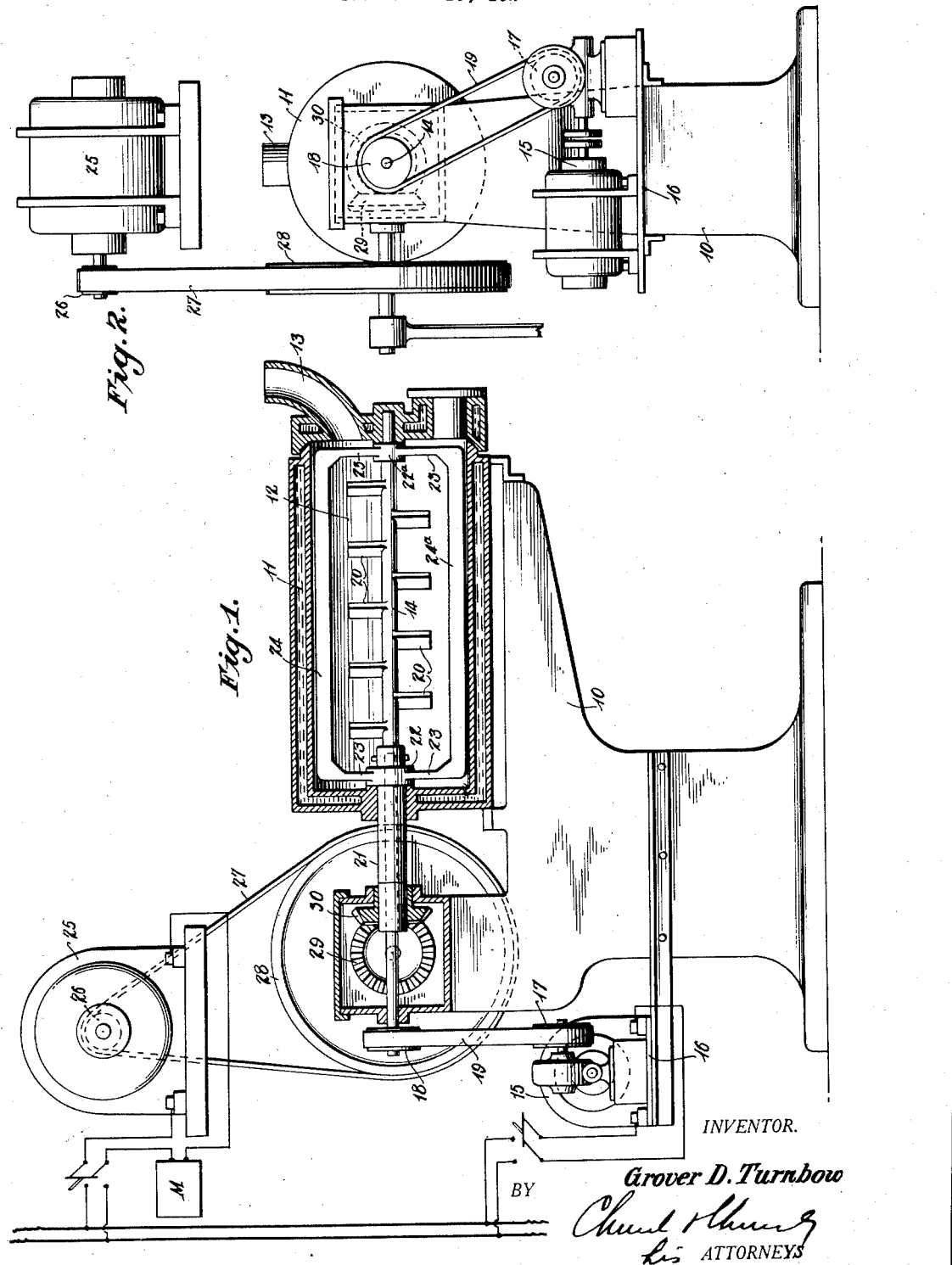
INVENTOR.
Grover D. Turnbow
BY
his ATTORNEYS Patented Jan. 15, 1929.

1,699,170

UNITED STATES PATENT OFFICE.

GROVER D. TURNBOW, OF DAVIS, CALIFORNIA, ASSIGNOR OF ONE-HALF TO CHESTER EARL GRAY, OF OAKLAND, CALIFORNIA.

APPARATUS FOR PRODUCING FROZEN-FOOD PRODUCTS.

Application filed November 13, 1926. Serial No. 148,284.

This invention relates to improved apparatus for preparing frozen food products, and particularly the preparation of ice cream.

In the preparation of frozen food products, such as ice cream, it is of especial importance that a certain amount of air or other gases be incorporated in the finished product. Efforts have been made to incorporate carbon dioxide and other gases instead of air, but such efforts have met with more or less indifferent success, and as a result the incorporation of air in the product is the usual procedure. However, whether air or gas is used, and the nature of the gas, if a gas is used, is immaterial in so far as the present invention is concerned. This incorporation of air or gas in a product such as ice cream is necessary to give it the desired characteristics, such as texture, and it therefore follows that the most desirable characteristics and quality are obtained in the final product when there is a certain relation between the air or gas content and the other ingredients constituting the ice cream. Much study has been given to the regulation and control of the air content in the finished product, but the results obtained have not been successful to any great extent.

Practically in all forms of apparatus heretofore used for the initial freezing of ice cream, heat is absorbed or transferred from the mixture to be frozen by having a chamber holding the mixture surrounded, or enclosed by a medium having a temperature considerably below the freezing point of the mixture to be frozen. In such apparatus, the transfer of the heat from the mixture to the freezing medium is naturally at the points where the mixture contacts with the walls of the container and in order to prevent the accumulation of frozen particles on the wall, to insure all portions of the mixture being brought into contacts with the walls, and to insure the frozen particles assuming a finely divided condition, means are provided for continuously removing frozen particles from the walls of the container as it freezes. Generally this is done by placing revoluble or scraping devices inside of the container, so that blades carried by such devices will scrape or remove frozen portions of the mixture which are in contact with the container walls. In this connection it is obvious that movement imparted to the mixture by the scraper blades tends to accelerate the rate of heat exchange, thereby reducing the time necessary for freezing the mixture.

In addition to the treatment of the mixture as above outlined, the apparatus for making ice cream heretofore known in the prior art also comprise means for beating or agitating the mixture concurrently with the freezing thereof, for the purpose of incorporating the air or gas which has heretofore been mentioned as being necessary to produce proper characteristics in the frozen product. Such beating or agitation of the mixture has been secured in prior art structures by having the frame for the scraping blades also formed with a shaft adapted to be located centrally of the freezing container and provided with blades or paddles which, when said frame and shaft are revolved, act as beaters to beat or whip air or other gases into the product while the mixture is being frozen.

As a result of certain experiments, it has been found that these prior art practices of concurrently beating and freezing the mixture results in the viscosity of the ingredients being altered considerably and, as a consequence, the resulting ice cream is not as stable as it might be; it is quite sensitive to heat shock, and it is not as capable of retaining the air incorporated therein as is desired, thereby affecting its texture. In view of this, the present invention contemplates an apparatus for producing ice cream wherein the viscosity of the ingredients or constituents of the mixture to be frozen are substantially unaltered so that the resulting product possesses considerably greater stability than present-day ice cream; it is less sensitive to heat shock and will retain the air incorporated therein much better than in the case of present-day methods. It should be added here that the retention by the ingredients of their natural viscosity stabilizes the mixture, so to speak, so that the operation of drawing off the frozen product from the freezing product will have practically no effect on the air content of the frozen product, a feature or characteristic which is possessed by ice cream produced in accordance with present-day practices. Furthermore, with the present apparatus, the drawing of the frozen product can be accomplished in such a way as to not affect detrimentally the air content and other characteristics of the product.

The method sought to be practiced by the apparatus of the present invention may, of course, undoubtedly be practiced with various forms of apparatus. However, one form of apparatus which has been advantageously used is illustrated in the accompanying drawings. The method set forth herein will be made the subject-matter of a separate application.

In the accompanying drawings:

Figure 1 is an elevational view, partly in section, showing more or less diagrammatically the apparatus employed in connection with the present invention.

Fig. 2 is an end elevation of the apparatus shown in Fig. 1.

In the particular apparatus illustrated herein, the pedestal 10 supports a suitable jacket 11 through which any desirable freezing medium is adapted to be circulated. Within said jacket 11 there is a container or receptacle 12 within which the mixture constituting the ice cream is to be frozen, the mixture being charged in said receptacle through suitable inlet 13. Extending axially of said container 12 is the shaft 14 which projects a considerable distance beyond one end of the jacket 11, its exterior end being journaled in one or more bearings carried by the pedestal 10. At its exterior end said shaft 14 is provided with means for revolving the same. Such driving means may consist of a motor 15 mounted on a shelf 16, constituting a part of pedestal 10, the shaft of said motor having a pulley 17 thereon connected to a pulley 18 on shaft 14 by an ordinary driving belt 19. Mounted on shaft 14 at spaced points within the freezing container 12 is a plurality of blades 20 which are termed or known as beater blades for agitating the mixture to incorporate air therein.

Journaled on shaft 14, and located partly within and partly without the jacket and container, is a sleeve 21 on whose inner end is mounted a collar 22, provided with four radially disposed arms 23. At their radial outer ends, arms 23 carry blades 24, 24ª, extending longitudinally of the container 12, said blades being supported at their opposite end by similar arms 23, which merge into a collar 22ª, loose on shaft 14. At its outer end, sleeve 21 is provided with suitable means for revolving said sleeve and the blades 24, 24ª carried thereby. Such means, of course, may take any desirable form, but in the present instance they consist of a motor 25 on whose shaft there is a pulley 26, connected by belt 27 to a pulley 28, said pulley 28 being mounted on a shaft which carries a beveled gear 29 adapted to mesh with a corresponding beveled gear 30 fast on said sleeve 21. It will be obvious that shaft 14, with the beater blades 20, may be rotated by motor 15, or, if desired, the blades 24, 24ª, may be revolved by motor 25, either of these operations being capable of being performed independently of the other. In operation, the receptacle 12 is charged with an amount of mixture that will allow for overflow and circulation of a freezing medium through jacket 11 then established. Those portions of the mixture in contact will be frozen by the exchange of heat units that will take place between them and the circulating freezing medium. During this freezing operation, motor 25 will function to revolve blades 24, 24ª, to prevent the accumulation of frozen particles on the walls of the container. Such movement of blades 24, 24ª will also serve for other purposes as before outlined, such as causing the frozen particles assuming a finely divided state and expediting the freezing of the entire body of the mixture. Due to the independent drive for the beater blades 20, the latter will remain substantially stationary, moving only to the extent that they are caused to by the movement of the mixture within the freezing receptacle. In this way, agitation of the mixture and consequent incorporation of air therein while being frozen is held at a minimum, so that the viscosity of the mixture is preserved in a very large measure with the result that when the product is finally finished, it possesses a superior texture and much greater stability than a product produced by a method wherein the mixture is agitated for the incorporation of air simultaneously while it is being frozen. In carrying out this freezing step, the scraping blades are revolved at a speed no faster than is absolutely necessary to produce ice crystals in a finely divided condition and after the water content is frozen to the extent necessary, the circulation of the freezing medium in the jacket is discontinued. The beaters 20 are then started by placing motor 15 in operation and the whipping effected by such blades is carried on until sufficient air is incorporated in the product. The time at which the proper quantity of air has been incorporated in the frozen mixture may be determined by the apparatus shown and described in my application No. 107,303, dated May 6, 1926. This apparatus, which determines the quantity of air incorporated in the mixture by the amount of energy required to drive the shaft 14 is shown diagrammatically in the accompanying drawing by M, but a further description thereof is deemed unnecessary, in view of the fact that it is fully disclosed in the application just referred to. In this way the desirable characteristics such as a superior texture and greater stability, are obtained in the final product by reason of the fact that there is no whipping of the mixture during the freezing operation. However, so far as the present invention is concerned, the scrapers 24 may remain stationary while beaters 20 are in operation for incorporating, or, if desired, the scrapers may continue in operation concurrently with the beaters 20. The important point is, the driving mechanisms are such that the beaters 20, are not operated in conjunction with the blades 24 during the freezing operation.

After the proper quantity of air has been incorporated in the frozen mixture, the beating device is then stopped and allowed to go free, while the mixture is unloaded from the freezer. This unloading or discharging of the frozen mixture is obtained by means of the blades 24ª, being disposed at an angle to the longitudinal center of the container instead of extending parallel thereto as in the case of blades 24. This angular disposition of the blades 24ª causes the frozen material to be discharged through a suitable opening 31 near the bottom of container 12. It is rather important that the beaters remain substantially stationary during the discharging operation, because after the proper quantity of air has been incorporated, as determined by the attachment M, it is desirable that the mixture be subsequently agitated as little as possible. This results in a product of uniform air content throughout, a result not possible with those forms of apparatus wherein the beaters function during the discharging operation. This is due to the fact that where the beaters continue to operate, the later increments of frozen product removed from the freezer are operated upon by the beaters a greater length of time than those portions of the same batch which are first removed, so that the subsequent portions of the batch which have thus been operated upon by the beaters a greater length of time are certain to have their air content detrimentally acted upon either by having the air content increased or decreased. The fact that such subsequently discharged increments of the same batch are acted upon by the beaters a greater length of time in the prior art structures is sufficient to insure the air content of such subsequent increments being affected one way or the other.

While the present invention has been described in connection with one particular form of apparatus, it is to be understood that the method described herein is susceptible of being practiced in any form of apparatus wherein the initial freezing operation may take place with a minimum agitation of the mixture; wherein, after the water content has been frozen to the desired extent the mixture may then be agitated for the incorporation of air therein without continuing the freezing operation; and wherein the agitation of the mixture can again be reduced to a minimum while the frozen mixture with the desired percentage of incorporated air is being discharged from the freezing receptacle. In other words, the fundamental point, broadly stated, is to freeze the mixture without effecting the viscosity of its contents; then agitate the frozen mixture to incorporate air; and subsequently remove the frozen mixture without materially effecting the air content thereof. In this connection it will be understood that in the commercial production of ice cream, the water content of the mixture is only partially frozen by the apparatus shown herein, complete freezing of the mixture taking place after the same has been placed in storage under proper temperature conditions.

What I claim is:

1. In an apparatus for producing ice cream, the combination of a container, means for charging said container with a mixture to be frozen, means for partially freezing the water content of the mixture, means for agitating the mixture while being frozen without substantially affecting the viscosity of the mixture, and means operable independently of said agitating means for incorporating air in the mixture, and means for discharging the frozen, aerated mixture from the container.

2. In an apparatus for producing ice cream, the combination of a container, means for circulating a freezing medium around said container, means for removing frozen portions of a mixture within the container from the walls of said container, beater blades for agitating the mixture within the container, and independent drive connections for said blades and for said means for removing frozen material from the container walls.

3. In an apparatus for producing ice cream, the combination of a container having charging and discharging openings, means for extracting heat units from a mixture within the container to partially freeze the water content of said mixture, scrapers for removing partially frozen material from the container walls, beater blades for agitating the mixture to incorporate air therein, separate drive connections for said scrapers and beaters, and means for discharging the aerated frozen product from the container.

4. In an apparatus for producing ice cream, the combination of a container having charging and discharging openings, means for extracting heat units from a mixture within the container to partially freeze the water content of said mixture, scrapers for removing partially frozen material from the container walls, beater blades for agitating the mixture to incorporate air therein, separate drive connections for said scrapers and beaters, and means for discharging the aerated frozen product from the container, said discharge means being operable independently of said beater blades.

5. In an apparatus for producing ice cream, the combination of a container, means for circulating a freezing medium around said container, means within the container for facilitating freezing of the mixture, without materially affecting the viscosity of the mixture, and means operable independently of the last mentioned means for incorporating air in the frozen product.

6. In an apparatus for producing ice cream, the combination of a container, means for facilitating freezing a mixture in said container, means for agitating said mixture to incorporate air therein, and means for discharging said aerated frozen mixture from said container, said discharge means and said agitating means being separately operable, whereby said agitating means may be rendered inoperative during the discharging operation.

GROVER D. TURNBOW.